(12) United States Patent
Kumar

(10) Patent No.: US 11,281,795 B2
(45) Date of Patent: Mar. 22, 2022

(54) HIERARCHICAL RANDOM SCRAMBLING OF SECURE DATA STORAGE RESULTING IN RANDOMNESS ACROSS CHIPS AND ON POWER ON RESETS OF INDIVIDUAL CHIPS

(71) Applicant: STMicroelectronics International N.V., Geneva (CH)

(72) Inventor: Dhulipalla Phaneendra Kumar, Noida (IN)

(73) Assignee: STMicroelectronics International N.V., Geneva (CH)

( * ) Notice: Subject to any disclaimer, the term of this patent is extended or adjusted under 35 U.S.C. 154(b) by 272 days.

(21) Appl. No.: 16/726,498

(22) Filed: Dec. 24, 2019

(65) Prior Publication Data
US 2021/0192070 A1     Jun. 24, 2021

(51) Int. Cl.
G06F 21/00     (2013.01)
G06F 21/62     (2013.01)
G06F 7/58      (2006.01)

(52) U.S. Cl.
CPC .......... *G06F 21/6227* (2013.01); *G06F 7/588* (2013.01)

(58) Field of Classification Search
None
See application file for complete search history.

(56) References Cited

U.S. PATENT DOCUMENTS 4,064,558  A  * 12/1977  Hughes ............... G06F 12/02
                                                       711/207
8,301,912  B2 * 10/2012  Lin .................... G06F 21/725
                                                       713/193
8,375,225  B1   2/2013   Ybarra
8,555,015  B2 * 10/2013  Muchsel ............... G06F 21/71
                                                       711/163
8,867,739  B2   10/2014  Danger
9,152,805  B2   10/2015  Yamashita
2007/0299894 A1 12/2007  Muraoka
(Continued)

FOREIGN PATENT DOCUMENTS

EP        3021226 A1     5/2016

OTHER PUBLICATIONS

EP Search Report for co-pending EP Appl. No. 20214500.9 dated May 6, 2021 (5 pages).

(Continued)

*Primary Examiner* — Maung T Lwin
(74) *Attorney, Agent, or Firm* — Crowe & Dunlevy (57) ABSTRACT

A system includes a random number generator generating a random number in response to an event. Control logic generates hierarchical part alignment selectors from the random number. For each secure data block to be stored in volatile storage, a physical address of a first logical address for that secure data block is set based upon the hierarchical part alignment selectors. For each data word within that secure data block, a physical address of a first logical address for that data word is set based upon the hierarchical part alignment selectors. For each data byte within that data word, a physical address of a first logical address for that data byte is set based upon the hierarchical part alignment selectors. A physical address of a logical address for a first data bit within that data byte is set based upon the hierarchical part alignment selectors.

23 Claims, 6 Drawing Sheets

(56) References Cited

U.S. PATENT DOCUMENTS

2013/0262880 A1    10/2013  Pong et al.
2016/0140356 A1*   5/2016   Tasher ................ G06F 12/1408
                                                            726/29

OTHER PUBLICATIONS

Microchip SAM L10/L11 Family, "Ultra Low-Power, 32-bit Cortex-M23 MCUs with TrustZone, Crypto, and Enhanced PTC," 2019 Microchip technology Inc., Datasheet, relevant pages totaling 49.
ATMEL: "CryptoCompanion(tm) Chip for CryptoMemory and CryptoRF," AT88SC018, 5277C-CryptoCompanion, Sep. 2009.
Waksman, Adam, et al: "Silencing Hardware Backdoors," May 22, 2011.

* cited by examiner

POR Cycle 0
BLK_RND[b:0]=0
WRD_RND[w:0]=0
BYT_RND[m:0]=0

POR Cycle 1
BLK_RND[b:0]=1
WRD_RND[w:0]=2
BYT_RND[m:0]=1

FIG. 6

| BLK_RND[b:0] | bb | ... | b1 | b0 |
|---|---|---|---|---|
| WRD_RND[w:0] | bw | ... | b1 | b0 |
| BYT_RND[m:0] | bm | ... | b1 | b0 |
| BIT_RND[7:0] | bn | ... | b1 | b0 |

POR Cycle 0
LVL1_RND[L:0]=0

| BLK_RND[b:0] | ... | ... | b0 | bb |
|---|---|---|---|---|
| WRD_RND[w:0] | ... | ... | b0 | bw |
| BYT_RND[m:0] | ... | ... | b0 | bm |
| BIT_RND[7:0] | ... | ... | b0 | bn |

POR Cycle 1
LVL1_RND[L:0]=1

FIG. 7

HIERARCHICAL RANDOM SCRAMBLING OF SECURE DATA STORAGE RESULTING IN RANDOMNESS ACROSS CHIPS AND ON POWER ON RESETS OF INDIVIDUAL CHIPS

TECHNICAL FIELD

This application is directed to the field of secure data storage involving the hierarchical scrambling of secure data across chips and at every power on reset of individual chips based upon parts of a random number.

BACKGROUND

Data security is of importance in a variety of applications, such as embedded applications. Conventionally, secure data is stored in a sequential manner in a chain of flip flops, and the physical location of these flip flops within a chip is scrambled to as so provide protection against physical hacks.

This technique, however, is not without drawbacks. First, as should be evident, the scrambling of the physical location of the chained flip flops requires a large amount of interconnection circuitry to provide the connections between the flip flops, consuming area for this routing. In addition, the scrambling remains static across chips of the same design, and remains static within each chip regardless of whether a power on reset of the chip is performed. This fixed routing, and this uniform scrambling between different chips, may not fully prevent sophisticated hacks from recovering at least some of the secure data, which is clearly undesirable.

As such, further developments into this area are needed.

SUMMARY

A secure data storage device is disclosed herein and includes a random number generator configured to generate a random number in response to an event, a volatile storage, and a code randomizer. The code randomizer is configured to generate hierarchical part alignment selectors from the random number. For each of a plurality of secure data blocks to be stored in the volatile storage, the code randomizere is configured to set a physical address of a first logical address for that secure data block within the volatile storage based upon the hierarchical part alignment selectors. For each of a plurality of data words within that secure data block, the code randomizer is configured to set a physical address of a first logical address for that data word based upon the hierarchical part alignment selectors. For each of a plurality of data bytes within that data word, the code randomizer is configured to set a physical address of a first logical address for that data byte based upon the hierarchical part alignment selectors, and set a physical address of a logical address for a first of a plurality of data bits within that data byte based upon the hierarchical part alignment selectors. Each data bit, data byte, data word, and secure data block is stored in the volatile storage according to the set physical addresses therefor.

The code randomizer may be configured to, for each of the plurality of secure data blocks, set a physical address of each subsequent logical address for that secure data block by incrementing the physical address of an immediately preceding logical address for that secure data block. For each of the plurality of data words within that secure data block, the code randomizer may be configured to set a physical address of each subsequent logical address for that data word by incrementing the physical address of an immediately preceding logical address for that data word. For each of the plurality of data bytes within that data word, the code randomizer may be configured to set a physical address of each subsequent logical address for that data byte by incrementing the physical address of an immediately preceding logical address for that data byte, and set a physical address of each subsequent data bit of that data word by incrementing the physical address of an immediately preceding data bit of that data word.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

Figure 1A:
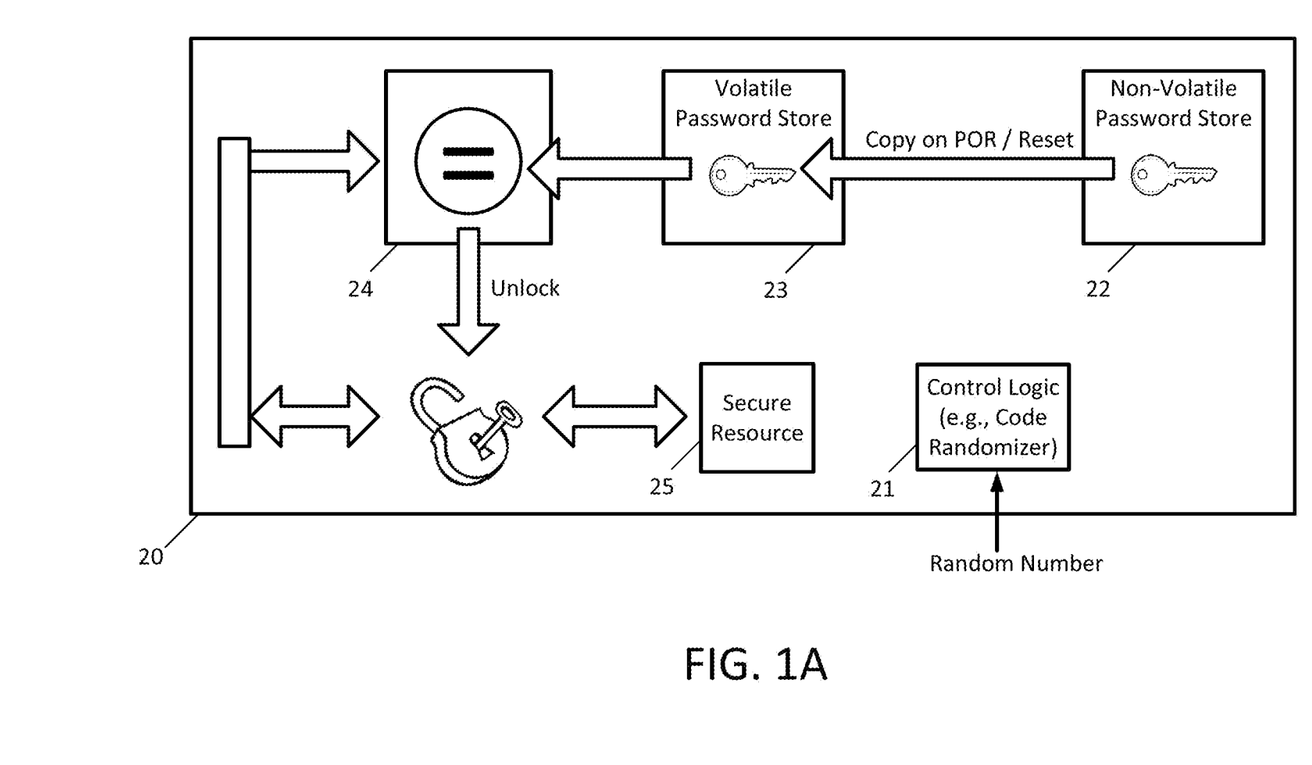
FIG. 1A is a block diagram of a secure data storage device in accordance with this disclosure.

With initial reference to FIG. 1A, a secure data storage device 20 is now described. The secure data storage device 20 includes a non-volatile password store 22, a volatile password store 23, comparison logic 24, a secure resource 25, and control logic 21 (such as a code randomizer, which will be explained below).

Figure 1B:
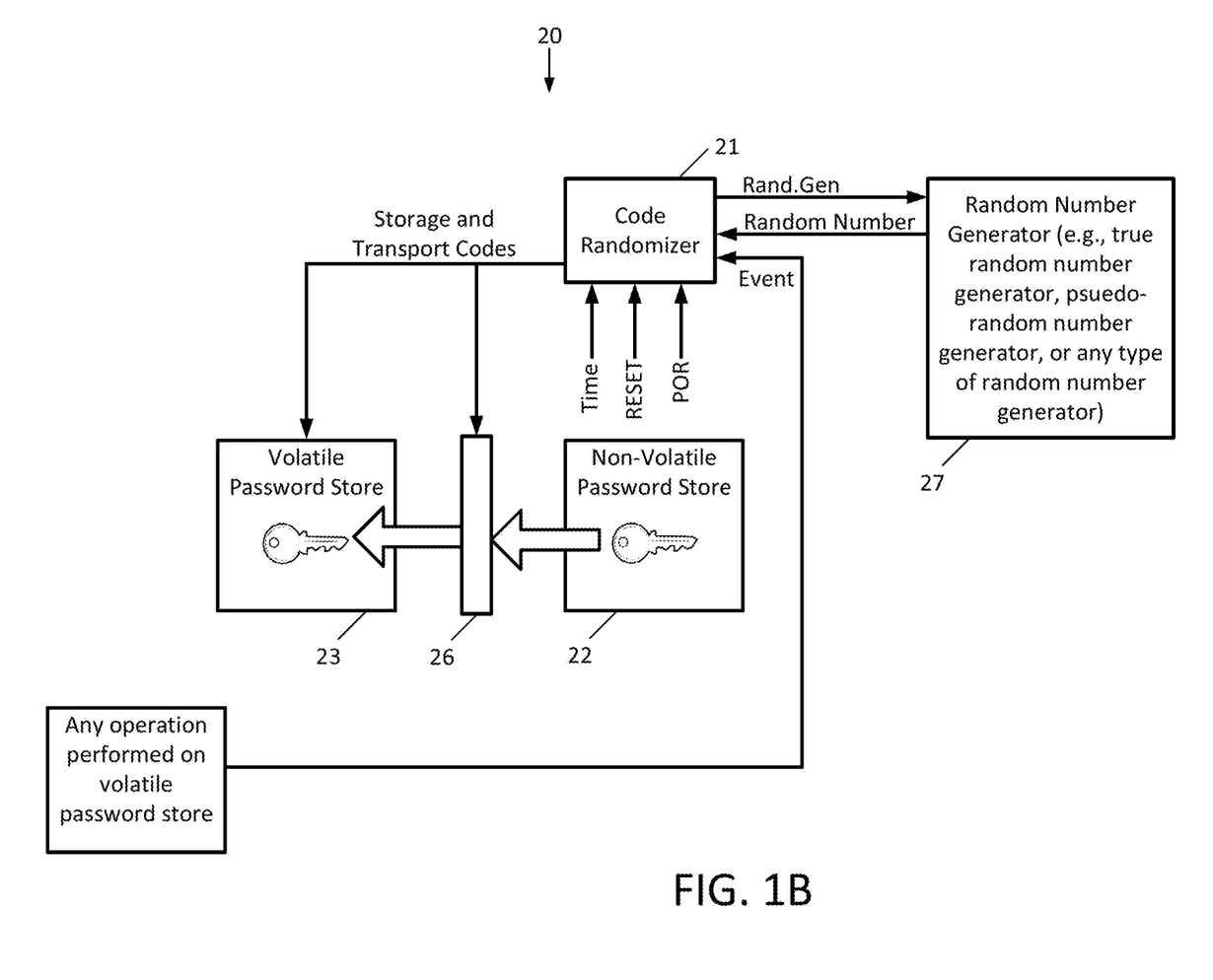
FIG. 1B is a block diagram showing the secure data storage device of FIG. 1A when storing secure data in the volatile storage of FIG. 1A.

In operation, upon powerup or a power-on reset, the non-volatile password store 22 copies its stored secure content to a volatile password store 23 over an interface (described below, and shown in FIG. 1B as 26). The stored secure content is, as will be explained below in detail, copied from the non-volatile password store 22 to the volatile password store 23 and stored in the volatile password store 23 pursuant to hierarchical part alignment selectors generated by the control logic 21. When a user wants to access the secure resource 25, the user is challenged to provide a challenge response that matches a password stored in the volatile password store 23. The challenge response is received at the comparison logic 24, which unlocks the secure resource 25 to permit reading from and/or writing to the secure resource 25 by the user if the challenge response matches the password stored in the volatile password store 23. If the challenge response does not match the password stored in the volatile password store 23, the comparison logic 24 does not grant access to the secure resource 25.

The storage of the secure content in the volatile password store 23 will now be described, referring first to FIG. 1B. The code randomizer 21, upon startup, upon a power-on reset, and/or upon occurrence of a given event (such as any operation performed on the volatile password store 23) sends a random number generation request (Rand.Gen) to a random number generator 27, which responds by sending a random number to the code randomizer 21. The code randomizer 21 may also send the random number generation request to the random number generator 27 periodically during operation, or asynchronously during operation (such as randomly during operation). The random number generator 27 may be any type of random number generator, such as a true random number generator or psuedo-random number generator.

From the random number, the code randomizer 21 generates hierarchical part alignment selectors (also referred to as storage and transport codes) which, as will be explained below in detail, will be used to control storage of the secure data in the volatile password store 23 through the interface 26. The code randomizer 21 also controls storage of the generated part alignment selectors in the volatile storage 23 so that the part alignment selectors may be used to access the secure data after storage, until the generation of new part alignment selectors. When new part alignment selectors are generated, the same secure data may be moved and stored pursuant to the part alignment selectors, or new secure data may be stored pursuant to the part alignment selectors.

Figure 2:
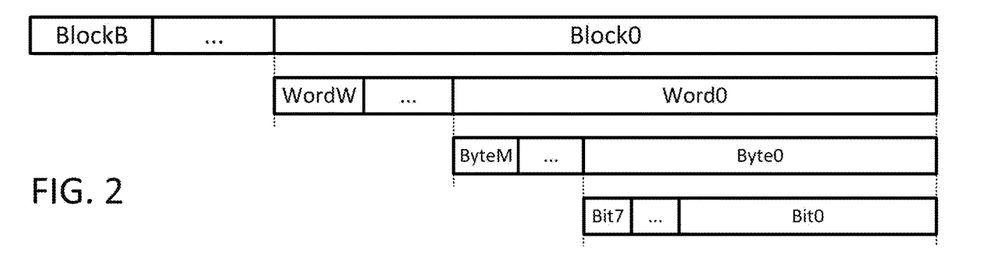
FIG. 2 is a diagram illustrating the division of blocks into words, words into bytes, and bytes into bits.

The part alignment selectors and the use thereof to effectuate secure data storage will now be described, but first, with reference to FIG. 2, the structure of data as stored in the volatile storage 23 is described.

The data as stored in the volatile storage 23 is arranged into multiple blocks of secure data. This can be seen in FIG. 2 as Block0, . . . , BlockB, with "B" being any integer to denote there may be any such number of blocks of secure data. As can also be seen, each block is arranged into multiple words, here shown as Word0, . . . , WordW, with "W" being any integer to denote that there may be any such number of words per block of secure data. Common word lengths are 16, 32, 64, 128, and 256 bits, for example. As can further be seen, each word is arranged into multiple bytes, here shown as Byte0, . . . , ByteM, with "M" being any integer to denote that there may be any such number of bytes per word. Finally, each byte is arranged into multiple bits, here shown as Bit0, . . . , Bit7, with the final bit being Bit7 because a byte contains 8 bits.

Each bit stored within the volatile storage has a physical address and a logical address. "Physical address" refers to an address directly fed to periphery circuitry that controls access to and from the volatile storage, and is fixed on a bit by bit basis. That is, a given physical address is directly linked to certain physical cells of the volatile storage. "Logical address" refers to an address used by software to access portions of the volatile storage, but that is not directly linked to certain physical cells of the volatile storage. For example, a given logical address may be configured to correspond to a given physical address, or may be reconfigured to correspond to a different physical address on the fly.

Each block of secure data is stored within a set of physical addresses in the volatile storage 23 that is allocated to that block of secure data. Each block of secure data includes multiple data words, with each of those data words being stored within a subset of physical addresses within the set of physical addresses allocated to its associated block of secure data. Each data word includes multiple bytes, with each of those bytes being stored within a subset of physical addresses within the subset of physical addresses allocated to that data word. Each byte includes multiple bits, with each of those bits being stored within a physical address within the subset of physical addresses allocated to that data byte.

It should be appreciated that each block of secure data, each data word, and each byte has a range of logical addresses allocated to it. The physical addresses corresponding to the logical addresses are set based upon the hierarchical part alignment selectors.

Referring now to the hierarchical part alignment selectors, the code randomizer 21 generates from the random number a block alignment selector BLK_RND[b:0], a word alignment selector WRD_RND[w:0], a byte alignment selector BYT_RND[m:0], and a bit alignment selector BIT_RND[7:0]. Note that each of these selectors will change, for example, at each power-on reset. Also note that these selectors will be chip independent, such that knowing the selectors of one chip will not be of use in attempting to read the secure data from another chip.

Figure 3:
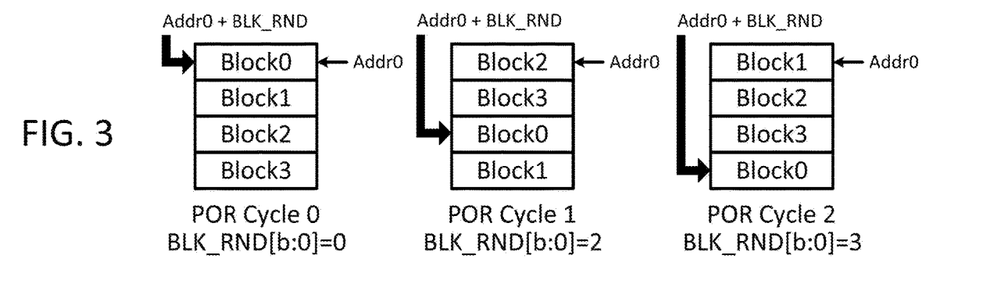
FIG. 3 is a diagram illustrating the randomization of the first physical address of Block0 when storing secure data, in the volatile storage of FIGS. 1A-1B.

The effect of the block alignment selector BLK_RND[b:0] can be seen in FIG. 3. Assume that the blocks of secure data are stored across a given range of contiguous physical addresses, and that the blocks of secure data are stored contiguously with one another.

Addr0 denotes the first physical address of the first secure data block, and Addr0+BLK_RND denotes the physical address corresponding to the first logical address of the first secure data block (the first logical address of the first secure data block here being denoted as Block0), with physical addresses of subsequent logical addresses of the data blocks being incremented from the physical address of Block0 and wrapping around at the end of storage.

As can be seen here, at the first power-on reset (POR Cycle 0), the block alignment selector BLK_RND[b:0] is equal to 0, meaning that the physical address of Block0 is 0 (equal to the first physical secure data block address). However, since BLK_RND[b:0] changes at each power-on reset, at the second power-on reset (POR Cycle 1), the block alignment selector BLK_RND[b:0] is equal to 2, meaning that the physical address of Block0 is 2 (the third physical secure data block address). As another example, at the third power-on reset (POR Cycle 2), the block alignment selector BLK_RND[b:0] is equal to 3, meaning that the physical address of Block0 is 3 (the fourth physical secure data block address).

Figure 4:
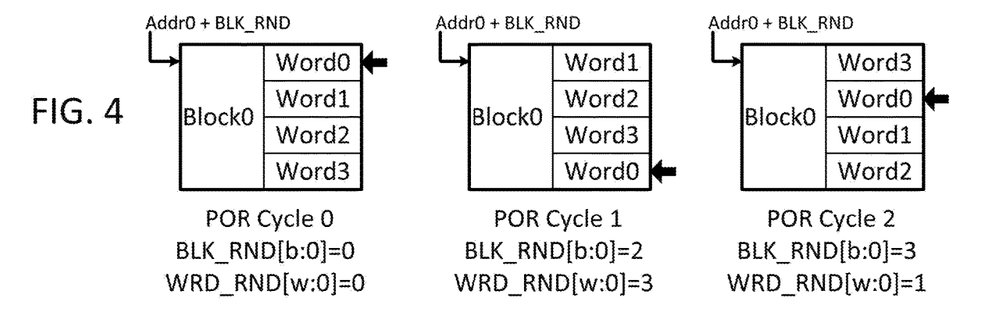
FIG. 4 is a diagram illustrating the randomization of the first physical address of Word0 in a given block when storing secure data, in the volatile storage of FIGS. 1A-1B.

The effect of the word alignment selector WRD_RND[w:0] can be seen in FIG. 4. Assume that the data words are stored across a given range of contiguous physical addresses, and that the data words within a given block of secure data are stored contiguously with one another.

Keep in mind that the power-on reset cycles referred to here are the same as those referred to in FIG. 3. WRD_RND[w:0] denotes the first physical address of the first words in the blocks of secure data (which here are denoted as having a logical address of Word0), with physical addresses of subsequent logical addresses of words being incremented from the physical address of Word0 and wrapping around at the end of storage.

As examples, at the first power-on reset (POR Cycle 0), the word alignment selector WRD_RND[w:0] is equal to 0, meaning that the physical address of the Word0 in each block of secure data is equal to the first physical word address in each block of secure data. At the second power-on reset (POR Cycle 1), the word alignment selector WRD_RND[w:0] is equal to 3, meaning that the physical address of Word0 is 3 and therefore equal to the fourth physical word address in each block of secure data. As another example, at the third power-on reset (POR Cycle 2), the word alignment selector WRD_RND[w:0] is equal to 1, meaning that the physical address of Word0 is 1 and therefore equal to the second physical word address in each block of secure data.

Figure 5:
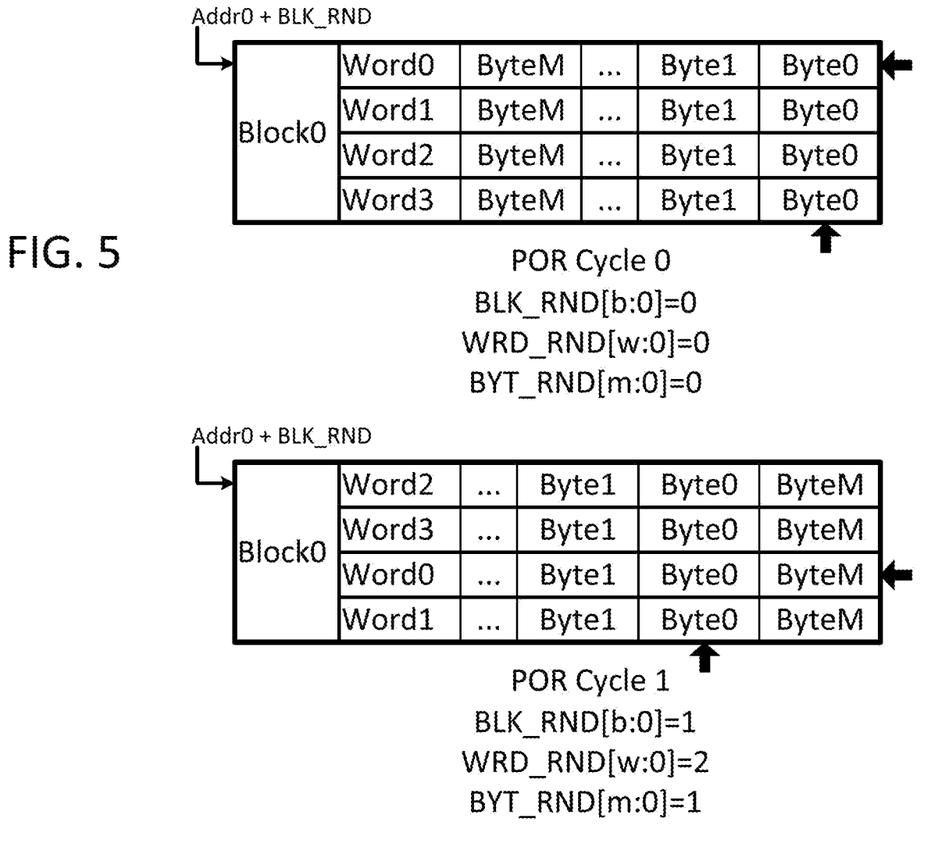
FIG. 5 is a diagram illustrating the randomization of the first physical address of a byte of a given word in a given block when storing secure data, in the volatile storage system of FIGS. 1A-1B.

The effect of the byte alignment selector BYT_RND[m:0] can be seen in FIG. 5. Assume that the data bytes are stored across a given range of contiguous physical addresses, and that the data bytes within a given data word are stored contiguously with one another.

Keep in mind that the power-on reset cycles referred to here are the same as those referred to in FIGS. 3-4. BYT_RND[m:0] denotes the first physical address of the first bytes in the words of the blocks of secure data (which here are denoted as having a logical address of Byte0), with physical addresses of subsequent logical addresses of the bytes being incremented from the physical address of Byte0 and wrapping around at the end of storage.

As examples, at the first power-on reset (POR Cycle 0), the byte alignment selector BYT_RND[m:0] is equal to 0, meaning that the physical address of the Byte0 in each word of each block of secure data is equal to the first physical byte address in each word in each block of secure data. At the second power-on reset (POR Cycle 1), the byte alignment selector BYT_RND[m:0] is equal to 1, meaning that the physical address of Byte0 is 1 and therefore equal to the second physical byte address in each word in each block of secure data.

Figure 6:
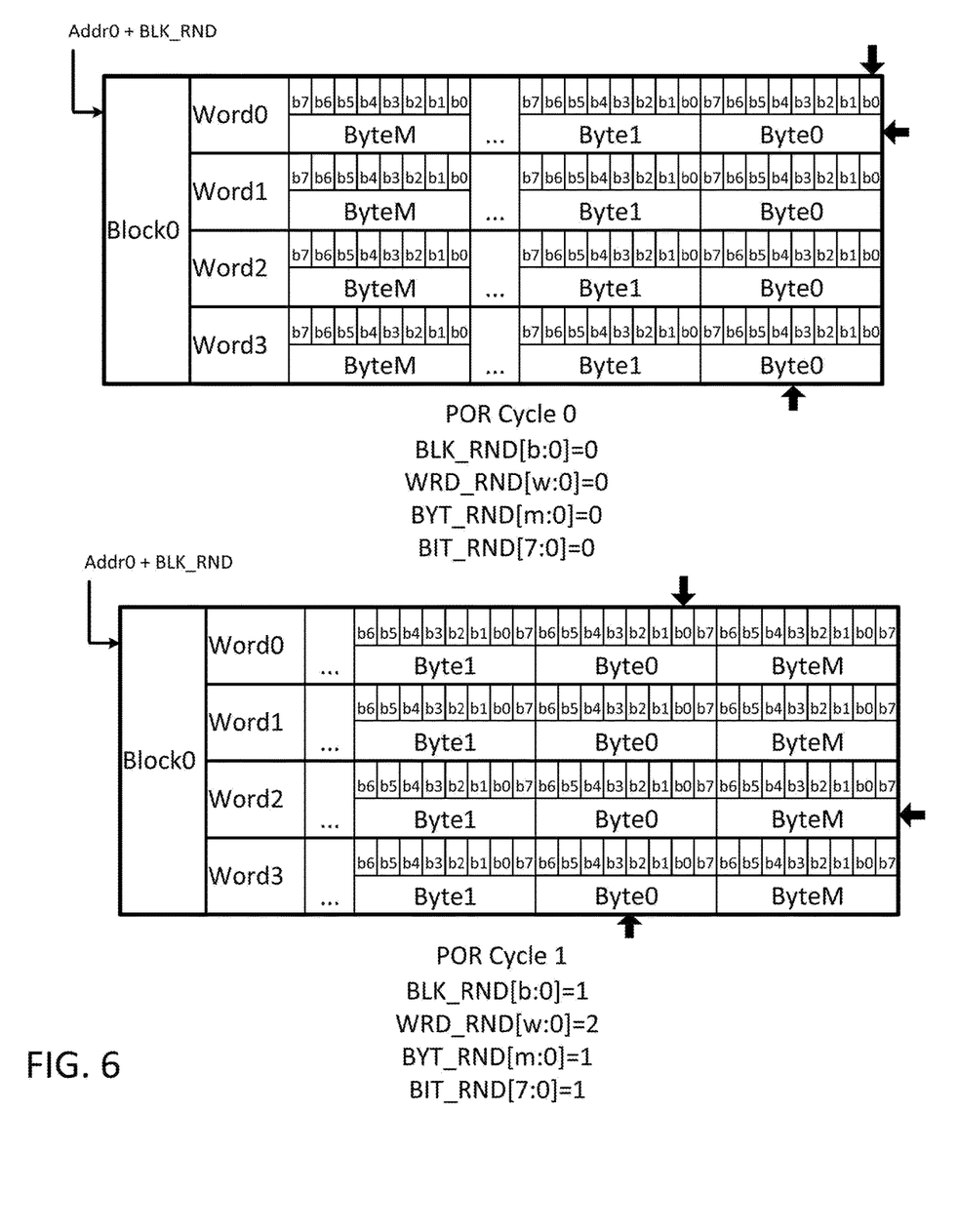
FIG. 6 is a diagram illustrating the randomization of the first physical address of a given byte of a given word in a given block when storing secure data, in the volatile storage system of FIGS. 1A-1B.

The effect of the bit alignment selector BIT_RND[7:0] can be seen in FIG. 6. Assume that the data bits are stored across a given range of contiguous physical addresses, and that the data bits within a given byte are stored contiguously with one another.

Keep in mind that the power-on reset cycles referred to here are the same as those referred to in FIGS. 3-5. BIT_RND[7:0] denotes the first physical address of the first bits in the bytes of the words of the blocks of secure data (which here are denoted as having a logical address of Bit0), with the physical addresses of subsequent logical addresses of the bits being incremented from the physical address of Bit0 and wrapping around at the end of storage.

As examples, at the first power-on reset (POR Cycle 0), the bit alignment selector BIT_RND[7:0] is equal to 0, meaning that the physical address of the Bit0 in each byte of each word of each block of secure data is equal to the first physical bit address in each byte of each word in each block of secure data. At the second power-on reset (POR Cycle 1), the bit alignment selector BIT_RND[7:0] is equal to 1, meaning that the physical address of Bit0 is 1 and therefore equal to the second physical bit address in each byte of each word in each block of secure data.

As explained, the code randomizer 21 also controls storage of the generated part alignment selectors BLK_RND[b:0], WRD_RND[w:0], BYT_RND[m:0], and BIT_RND[7:0] into the volatile storage 23 so that the part alignment selectors may be used to access the secure data blocks after storage into the volatile storage 23 pursuant to the generated part alignment selectors. The part alignment selectors BLK_RND[b:0], WRD_RND[w:0], BYT_RND[m:0], and BIT_RND[7:0] may be stored in unscrambled form.

Figure 7:
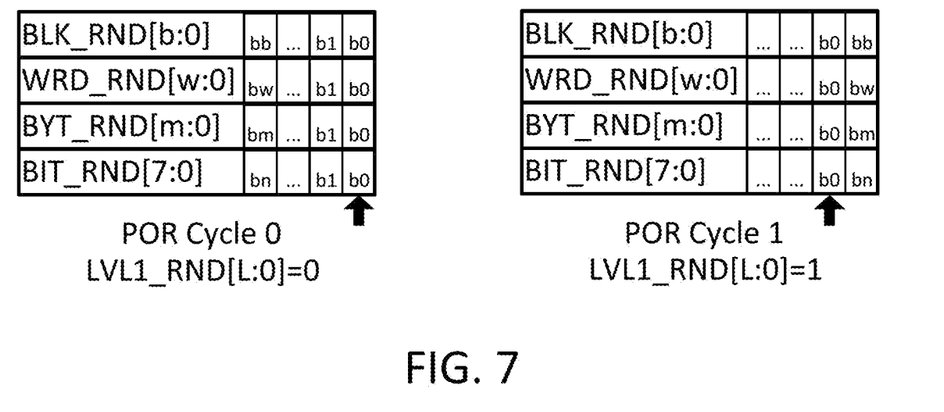
FIG. 7 is a diagram illustrating the storage of the random number from which the above randomizations are based upon, and the randomization of the storage of that random number, in the volatile storage of FIGS. 1A-1B.

Alternatively, for additional security, as shown in FIG. 7, the part alignment selectors BLK_RND[b:0], WRD_RND[w:0], BYT_RND[m:0], and BIT_RND[7:0] may be scrambled upon storage, with the part alignment selector scrambler LVL1_RND[L:0] (also generated from the random number by the code randomizer 21 and stored in the volatile storage 23) being used to denote the first physical address location for each of the part alignment selectors BLK_RND[b:0], WRD_RND[w:0], BYT_RND[m:0], and BIT_RND[7:0]. For example, in the first power-on reset cycle, LVL1_RND[L:0] is 0, meaning that the first physical address location for each of the part alignment selectors is the first physical address allocated for each of the part alignment selectors. However, since LVL1_RND[L:0] changes upon each power-on reset cycle, in the second power-on reset cycle, LVL1_RND[L:0] is 1, meaning that the first physical address location for each of the part alignment selectors is the second physical address allocated for each of the part alignment selectors, and that the bits of the part alignment selectors wrap around when the end of the allocated physical addresses is reached.

As another alternative, the part alignment selectors BLK_RND[b:0], WRD_RND[w:0], BYT_RND[m:0], and BIT_RND[7:0] may be stored in a logically unscrambled form in chains of flip flops in the volatile storage 23, with ones of those flip flops being scrambled physically in terms of location.

As still another alternative, rather than LVL1_RND[L:0] being used to scramble each part alignment selector, a different part alignment selector scrambler may be used for each part alignment selector BLK_RND[b:0], WRD_RND[w:0], BYT_RND[m:0], and BIT_RND[7:0].

Note that in the above description, the volatile storage 23 may be comprised of volatile memory, and/or flip flops, and that any above described secure data blocks, part scramblers, and part alignment selector scramblers may be saved in the volatile memory and/or the flip flops.

In the above description, each bit of each secure data block has been described as being stored contiguously in terms of physical address, and the secure data blocks have been described as being stored contiguously in terms of physical address. Therefore, the incrementation of addresses discussed above has been by one. However, it should be understood that that secure data blocks, data words, data bytes, and data bits need not be stored contiguously with each other in terms of physical addresses, and therefore incrementation may simply mean increment by an appropriate number, or to another range of physical addresses so that sometimes incrementation may be by one and sometimes may be by multiple physical addresses.

Through the performance of the above techniques, the security of the secure data storage device 20 is enhanced by defending against the types of attacks described above in the background. Indeed, it is the use of the part alignment selectors (generated from the random number) to link the physical addresses to the logical addresses that provides this enhance security.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A system, comprising:
a random number generator configured to generate a random number in response to an event;
a volatile storage; and
control logic configured to:
generate hierarchical part alignment selectors from the random number;
for each of a plurality of secure data blocks to be stored in the volatile storage:
set a physical address of a first logical address for that secure data block within the volatile storage based upon the hierarchical part alignment selectors;
for each of a plurality of data words within that secure data block:
set a physical address of a first logical address for that data word based upon the hierarchical part alignment selectors;
for each of a plurality of data bytes within that data word:
set a physical address of a first logical address for that data byte based upon the hierarchical part alignment selectors; and
set a physical address of a logical address for a first of a plurality of data bits within that data byte based upon the hierarchical part alignment selectors; and
store each data bit, data byte, data word, and secure data block in the volatile storage according to the set physical addresses therefor.

2. The system of claim 1, wherein the control logic is configured to:
for each of the plurality of secure data blocks:
set a physical address of each subsequent logical address for that secure data block by incrementing the physical address of an immediately preceding logical address for that secure data block;
for each of the plurality of data words within that secure data block:
set a physical address of each subsequent logical address for that data word by incrementing the physical address of an immediately preceding logical address for that data word;
for each of the plurality of data bytes within that data word:
set a physical address of each subsequent logical address for that data byte by incrementing the physical address of an immediately preceding logical address for that data byte; and
set a physical address of each subsequent data bit of that data word by incrementing the physical address of an immediately preceding data bit of that data word.

3. The system of claim 2, wherein the incrementing of the physical address of each subsequent logical address for that secure data block comprises incrementing by one.

4. The system of claim 2, wherein the incrementing of the physical address of each subsequent logical address for that data word comprises incrementing by one.

5. The system of claim 2, wherein the incrementing of the physical address of each subsequent logical address for that data byte comprises incrementing by one.

6. The system of claim 2, wherein the incrementing of the physical address of an immediately preceding data bit of that data word comprises incrementing by one.

7. The system of claim 1, wherein the event is a power-on reset of the system.

8. The system of claim 1, wherein the event is a startup of the system.

9. The system of claim 1, wherein the event is a periodic event occurring during operation of the system.

10. The system of claim 1, wherein the event is an asynchronous event occurring during operation of the system.

11. The system of claim 1, wherein the control logic is further configured to store the hierarchical part alignment selectors in the volatile storage after storage of each data bit, data byte, data word, and secure data block in the volatile storage.

12. The system of claim 11, wherein the control logic stores the hierarchical part alignment selectors in an unscrambled form.

13. The system of claim 11, wherein the control logic stores the hierarchical part alignment selectors within physically scrambled flip flops located within the volatile storage, wherein the physical scrambling of the flop flops indicates that the flip flops are remotely located to one another.

14. The system of claim 11,
wherein the control logic generates a part selector scrambler from the random number; and
wherein, for each hierarchical part selector, the control logic sets a physical address of a first logical address for that hierarchical part selector within the volatile storage based upon the part selector scrambler.

15. The system of claim 14, wherein the control logic is configured to, for each hierarchical part selector, set a physical address of each subsequent logical address for that hierarchical part selector by incrementing the physical address of an immediately preceding logical address for that hierarchical part selector.

16. The system of claim 11,
wherein the control logic generates a part selector scrambler for each hierarchical part selector from the random number; and
wherein, for each hierarchical part selector, the control logic sets a physical address of a first logical address for that hierarchical part selector within the volatile storage based upon the part selector scrambler for that hierarchical part selector.

17. The system of claim 16, wherein the control logic is configured to, for each hierarchical part selector, set a physical address of each subsequent logical address for that hierarchical part selector by incrementing the physical address of an immediately preceding logical address for that hierarchical part selector.

18. A method, comprising:
generating a random number in response to an event;
generating hierarchical part alignment selectors from the random number;
for each of a plurality of secure data blocks to be stored in volatile storage:
setting a physical address of a first logical address for that secure data block within the volatile storage based upon the hierarchical part alignment selectors;
for each of a plurality of data words within that secure data block:
setting a physical address of a first logical address for that data word based upon the hierarchical part alignment selectors;
for each of a plurality of data bytes within that data word:

setting a physical address of a first logical address for that data byte based upon the hierarchical part alignment selectors; and setting a physical address of a logical address for a first of a plurality of data bits within that data byte based upon the hierarchical part alignment selectors; and storing each data bit, data byte, data word, and secure data block in the volatile storage according to the set physical addresses therefor.

19. The method of claim 18, further comprising:
for each of the plurality of secure data blocks:
setting a physical address of each subsequent logical address for that secure data block by incrementing the physical address of an immediately preceding logical address for that secure data block;
for each of the plurality of data words within that secure data block:
setting a physical address of each subsequent logical address for that data word by incrementing the physical address of an immediately preceding logical address for that data word;
for each of the plurality of data bytes within that data word:
setting a physical address of each subsequent logical address for that data byte by incrementing the physical address of an immediately preceding logical address for that data byte; and
setting a physical address of each subsequent data bit of that data word by incrementing the physical address of an immediately preceding data bit of that data word.

20. The method of claim 19, wherein the incrementing of the physical address of each subsequent logical address for that secure data block comprises incrementing by one.

21. The method of claim 19, wherein the incrementing of the physical address of each subsequent logical address for that data word comprises incrementing by one.

22. The method of claim 19, wherein the incrementing of the physical address of each subsequent logical address for that data byte comprises incrementing by one.

23. The method of claim 19, wherein the incrementing of the physical address of an immediately preceding data bit of that data word comprises incrementing by one.

* * * * *